United States Patent
Miura et al.

(10) Patent No.: US 10,073,538 B2
(45) Date of Patent: Sep. 11, 2018

(54) ASSESSMENT OF A PASSWORD BASED ON CHARACTERISTICS OF A PHYSICAL ARRANGEMENT OF KEYS OF A KEYBOARD

(71) Applicant: International Business Machines Corporation, Armonk, NY (US)

(72) Inventors: Takeshi Miura, Tokyo (JP); Manabu Ohbayashi, Tokyo (JP); Hiroyuki Takenoshita, Tokyo (JP); Yuji Yanagihara, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 215 days.

(21) Appl. No.: 15/095,547

(22) Filed: Apr. 11, 2016

(65) Prior Publication Data

US 2017/0293365 A1   Oct. 12, 2017

(51) Int. Cl.
*G06F 3/023* (2006.01)
*G06F 21/46* (2013.01)

(52) U.S. Cl.
CPC .............. *G06F 3/023* (2013.01); *G06F 21/46* (2013.01)

(58) Field of Classification Search
CPC .......... G06F 21/46; G07F 19/201; G07F 7/10; G07F 7/1041
USPC ................. 345/156–168; 713/170, 182–184; 726/18
See application file for complete search history.

(56) References Cited

U.S. PATENT DOCUMENTS

| | | | |
|---|---|---|---|
| 5,394,471 A | * | 2/1995 | Ganesan ................. G06F 21/46 380/1 |
| 7,788,498 B2 | | 8/2010 | Yang et al. |
| 8,196,197 B2 | | 6/2012 | Cannizzaro et al. |

(Continued)

FOREIGN PATENT DOCUMENTS

| JP | 2004199320 | 7/2004 |
|---|---|---|
| JP | 2007148703 | 6/2007 |

(Continued)

OTHER PUBLICATIONS

Notification of Reasons for Refusal, Japan Application No. 2014-225627, dated Mar. 7, 2016, 3 pages.

(Continued)

*Primary Examiner* — Stacy Khoo
(74) *Attorney, Agent, or Firm* — Jared L. Montanaro

(57) ABSTRACT

The present invention provides a method and system for assessing a password based on characteristics of a physical arrangement of keys of a keyboard. A password including unique characters is stored. For each unique character of the password, a character key of the keyboard which denotes the unique character of the password is determined. A positive flag is assigned to each determined character key of the keyboard. A null flag is assigned to each key of the keyboard that is not one of the determined character keys. A key detection frequency is computed for each key vector of the keyboard. A maximum key detection frequency is determined from among the computed key detection frequencies of the key vectors. The maximum key detection frequency is compared with a threshold key detection frequency, from which it is ascertained whether the maximum key detection frequency is at least the threshold key detection frequency.

20 Claims, 13 Drawing Sheets

(56) References Cited

U.S. PATENT DOCUMENTS

| | | | |
|---|---|---|---|
| 8,539,247 | B2 | 9/2013 | McGrew et al. |
| 8,579,190 | B2 | 11/2013 | Golueke et al. |
| 9,721,088 | B2 | 8/2017 | Miura et al. |
| 2002/0054120 | A1 | 5/2002 | Kawano et al. |
| 2003/0140258 | A1 | 7/2003 | Nelson et al. |
| 2004/0073815 | A1 | 4/2004 | Sanai et al. |
| 2005/0057512 | A1 | 3/2005 | Du et al. |
| 2005/0071637 | A1 | 3/2005 | Shirakawa |
| 2006/0053301 | A1 | 3/2006 | Shin |
| 2008/0307235 | A1* | 12/2008 | Keohane ............... G06F 21/46 713/183 |
| 2009/0133120 | A1 | 5/2009 | Cannizzaro et al. |
| 2009/0313696 | A1 | 12/2009 | Himberger et al. |
| 2011/0239267 | A1* | 9/2011 | Lyne ............... G06F 21/46 726/1 |
| 2011/0317194 | A1 | 12/2011 | Nakanishi |
| 2012/0124654 | A1 | 5/2012 | Senac |
| 2012/0235912 | A1 | 9/2012 | Laubach |
| 2012/0235921 | A1 | 9/2012 | Laubach |
| 2012/0319958 | A1 | 12/2012 | Hiramoto |
| 2012/0323788 | A1 | 12/2012 | Keresman, III et al. |
| 2012/0326984 | A1 | 12/2012 | Ghassabian |
| 2013/0046544 | A1 | 2/2013 | Kay et al. |
| 2013/0269010 | A1 | 10/2013 | Wheeler |
| 2014/0009417 | A1 | 1/2014 | Sugimoto |
| 2014/0009418 | A1 | 1/2014 | Sugimoto |
| 2014/0098141 | A1 | 4/2014 | Sen et al. |
| 2014/0123274 | A1 | 5/2014 | Chen et al. |
| 2014/0181957 | A1 | 6/2014 | Nguyen |
| 2016/0125182 | A1 | 5/2016 | Miura et al. |
| 2017/0329960 | A1 | 11/2017 | Miura et al. |

FOREIGN PATENT DOCUMENTS

| | | |
|---|---|---|
| JP | 2008181440 | 8/2008 |
| JP | 2009089279 | 4/2009 |
| JP | 2010079562 | 4/2010 |
| JP | 2011154445 | 8/2011 |

OTHER PUBLICATIONS

Written Argument, Japan Application No. 2014-225627, Apr. 4, 2016, 2 pages.

Written Amendment, Japan Application No. 2014-225627, Apr. 4, 2016, 3 pages.

Decision to Grant Patent, Japan Application No. 2014-225627, Apr. 15, 2016, 6 pages.

Appendix P For related application, U.S. Appl. No. 14/864,986, filed Sep. 25, 2015, 1 page.

Spafford, Eugene H., Preventing Weak Password Choices, Purdue University, spaf@cs.purdue.edu Report No. 91-028, 1991, 12 pages.

Harpreet Singh Dhillon, Second Order Markov Model Based Proactive Password Checker, Department of Electronics and Communication Engineering, IIT Guwahati, India., Roll No. 04010214; email: harpreet@iitg.ernet.in, 2 pages.

Patent application for U.S. Appl. No. 14/864,986, filed Sep. 25, 2015, Conf. No. 8466.

Preliminary amendment (dated Oct. 13, 2015) for U.S. Appl. No. 14/864,986, filed Sep. 25, 2015, Conf. No. 8466.

Miura et al., "Evaluation of a Password," U.S. Appl. No. 15/665,526, filed Aug. 1, 2017.

List of IBM Patents or Patent Applications Treated as Related, Jul. 25, 2017, 2 pgs.

\* cited by examiner

| HORIZONTAL ROW | KEY DETECTION FREQUENCY | KEY DETECTION POSITION |
|---|---|---|
| A ROW | 0 | 0,0,0,0,0,0,0,0,0,0,0,0,0 |
| B ROW | 4 | 0,1,1,1,1,0,0,0,0,0,0,0,0 |
| C ROW | 0 | 0,0,0,0,0,0,0,0,0,0,0,0 |
| D ROW | 0 | 0,0,0,0,0,0,0,0,0,0,0 |

| HORIZONTAL ROW | KEY DETECTION FREQUENCY | KEY DETECTION POSITION |
|---|---|---|
| A ROW | 0 | 0,0,0,0,0,0,0,0,0,0,0,0,0 |
| B ROW | 3 | 0,1,1,1,0,0,1,0,0,0,0,0 |
| C ROW | 0 | 0,0,0,0,0,0,0,0,0,0,0,0 |
| D ROW | 0 | 0,0,0,0,0,0,0,0,0,0,0,0 |

| HORIZONTAL ROW | KEY DETECTION FREQUENCY | KEY DETECTION POSITION |
|---|---|---|
| A ROW | 0 | 0,0,0,0,0,0,0,0,0,0,0,0,0 |
| B ROW | 1 | 0,1,0,0,1,0,1,0,0,1,0,0 |
| C ROW | 0 | 0,0,0,0,0,0,0,0,0,0,0,0 |
| D ROW | 0 | 0,0,0,0,0,0,0,0,0,0,0 |

| VERTICAL COLUMN | KEY DETECTION FREQUENCY | KEY DETECTION POSITION |
|---|---|---|
| A COLUMN | 0 | 0,0,0,0 |
| B COLUMN | 1 | 0,0,0,1 |
| C COLUMN | 2 | 0,0,1,1 |
| D COLUMN | 3 | 0,1,1,1 |
| E COLUMN | 4 | 1,1,1,1 |
| F COLUMN | 0 | 0,0,0,0 |
| G COLUMN | 0 | 0,0,0,0 |
| H COLUMN | 0 | 0,0,0,0 |
| I COLUMN | 0 | 0,0,0,0 |
| J COLUMN | 0 | 0,0,0,0 |
| K COLUMN | 0 | 0,0,0,0 |
| L COLUMN | 0 | 0,0,0,0 |
| M COLUMN | 0 | 0,0,0,0 |

*FIG. 10*

| HORIZONTAL ROW | KEY DETECTION FREQUENCY | KEY DETECTION POSITION |
|---|---|---|
| A ROW | 2 | 1,1,0,0,0,0,0,0,0,0,0,0,0 |
| B ROW | 2 | 1,1,0,0,0,0,0,0,0,0,0,0,0 |
| C ROW | 2 | 1,1,0,0,0,0,0,0,0,0,0,0,0 |
| D ROW | 2 | 1,1,0,0,0,0,0,0,0,0,0,0,0 |

| VERTICAL COLUMN | KEY DETECTION FREQUENCY | KEY DETECTION POSITION |
|---|---|---|
| A COLUMN | 4 | 1,1,1,1 |
| B COLUMN | 4 | 1,1,1,1 |
| C COLUMN | 3 | 0,1,1,1 |
| D COLUMN | 2 | 0,0,1,1 |
| E COLUMN | 1 | 0,0,0,1 |
| F COLUMN | 0 | 0,0,0,0 |
| G COLUMN | 0 | 0,0,0,0 |
| H COLUMN | 0 | 0,0,0,0 |
| I COLUMN | 0 | 0,0,0,0 |
| J COLUMN | 0 | 0,0,0,0 |
| K COLUMN | 0 | 0,0,0,0 |
| L COLUMN | 0 | 0,0,0,0 |
| M COLUMN | 0 | 0,0,0,0 |

| HORIZONTAL ROW | KEY DETECTION FREQUENCY | KEY DETECTION POSITION |
|---|---|---|
| A ROW | 0 | 0,0,0,0,0,0,0,0,0,0,0,0,0 |
| B ROW | 2 | 0,0,1,1,0,0,0,0,0,0,0,0,0 |
| C ROW | 1 | 0,1,0,1,0,0,0,0,0,0,0,0,0 |
| D ROW | 4 | 1,1,1,1,0,0,0,0,0,0,0,0,0 |

| VERTICAL COLUMN | KEY DETECTION FREQUENCY | KEY DETECTION POSITION |
|---|---|---|
| A COLUMN | 1 | 0,0,0,1 |
| B COLUMN | 2 | 0,0,1,1 |
| C COLUMN | 3 | 0,1,1,1 |
| D COLUMN | 3 | 0,1,1,1 |
| E COLUMN | 3 | 0,1,1,1 |
| F COLUMN | 2 | 0,0,1,1 |
| G COLUMN | 1 | 0,0,0,1 |
| H COLUMN | 0 | 0,0,0,0 |
| I COLUMN | 0 | 0,0,0,0 |
| J COLUMN | 0 | 0,0,0,0 |
| K COLUMN | 0 | 0,0,0,0 |
| L COLUMN | 0 | 0,0,0,0 |
| M COLUMN | 0 | 0,0,0,0 |

| HORIZONTAL ROW | KEY DETECTION FREQUENCY | KEY DETECTION POSITION |
|---|---|---|
| A ROW | 1 | 1,0,0,0,1,0,0,0,0,0,0,0,0 |
| B ROW | 1 | 1,0,0,1,0,0,0,0,0,0,0,0,0 |
| C ROW | 1 | 1,0,1,0,0,0,0,0,0,0,0,0,0 |
| D ROW | 2 | 1,1,0,0,0,0,0,0,0,0,0,0,0 |

| VERTICAL COLUMN | KEY DETECTION FREQUENCY | KEY DETECTION POSITION |
|---|---|---|
| A COLUMN | 4 | 1,1,1,1 |
| B COLUMN | 3 | 0,1,1,1 |
| C COLUMN | 2 | 0,0,1,1 |
| D COLUMN | 3 | 0,1,1,1 |
| E COLUMN | 4 | 1,1,1,1 |
| F COLUMN | 0 | 0,0,0,0 |
| G COLUMN | 0 | 0,0,0,0 |
| H COLUMN | 0 | 0,0,0,0 |
| I COLUMN | 0 | 0,0,0,0 |
| J COLUMN | 0 | 0,0,0,0 |
| K COLUMN | 0 | 0,0,0,0 |
| L COLUMN | 0 | 0,0,0,0 |
| M COLUMN | 0 | 0,0,0,0 |

| HORIZONTAL ROW | KEY DETECTION FREQUENCY | KEY DETECTION POSITION |
|---|---|---|
| A ROW | 2 | 0,0,0,0,0,0,2,0,0,0,0,0,0 |
| B ROW | 2 | 0,0,2,0,0,0,0,1,0,0,0,0,0 |
| C ROW | 1 | 0,1,0,0,0,1,0,0,0,0,0,0,0 |
| D ROW | 1 | 0,1,0,0,0,0,0,0,0,0,0,0,0 |

| VERTICAL COLUMN | KEY DETECTION FREQUENCY | KEY DETECTION POSITION |
|---|---|---|
| A COLUMN | 0 | 0,0,0,0 |
| B COLUMN | 2 | 0,0,1,1 |
| C COLUMN | 4 | 0,2,1,1 |
| D COLUMN | 4 | 0,2,1,1 |
| E COLUMN | 1 | 0,0,0,1 |
| F COLUMN | 1 | 0,0,1,0 |
| G COLUMN | 4 | 2,1,1,0 |
| H COLUMN | 2 | 0,1,1,0 |
| I COLUMN | 0 | 0,0,0,0 |
| J COLUMN | 0 | 0,0,0,0 |
| K COLUMN | 0 | 0,0,0,0 |
| L COLUMN | 0 | 0,0,0,0 |
| M COLUMN | 0 | 0,0,0,0 |

ASSESSMENT OF A PASSWORD BASED ON CHARACTERISTICS OF A PHYSICAL ARRANGEMENT OF KEYS OF A KEYBOARD

TECHNICAL FIELD

The present invention relates to assessing whether a password can be generated by using characteristics of a physical key arrangement of keys of a keyboard.

BACKGROUND

A user of an information system generally registers a password in advance and subsequently inputs a password that matches the registered password for authenticating the user.

Prior art systems attempt to determine whether passwords registered by users are easily guessable. However, such systems fail to account for the fact that a password may be inputted by a user as an ordered arrangement of characters. Accordingly, such systems have a low probability of successfully determining whether passwords registered by users are easily guessable.

SUMMARY

The present invention provides a method, and associated computer system and computer program product, for assessing a password based on characteristics of a physical arrangement of keys of a keyboard. One or more processors of the computer system store, in a data store of the computer system, a password consisting of a plurality of characters that include at least two unique characters. For each unique character of the password, the one or more processors determine a character key, of the keyboard, which denotes the unique character of the password. The one or more processors assign: (i) to each determined character key of the keyboard, a positive flag having a value equal to at least 1; and (ii) to each key of the keyboard that is not one of the determined character keys, a null flag having a value of 0. For each key vector of the keyboard, the one or more processors compute a key detection frequency as equal to a sum of the values of the positive flags of the determined character keys in the key vector. The one or more processors determine a maximum key detection frequency from among the computed key detection frequencies of the key vectors. The one or more processors compare the maximum key detection frequency with a threshold key detection frequency and ascertain from the comparison whether or not the maximum key detection frequency is equal to or greater than the threshold key detection frequency.

BRIEF DESCRIPTION OF THE DRAWINGS

FIG. 10 depicts results from analysis of the keyboard of FIG. 8 and the key paths of FIG. 9, in accordance with embodiments of the present invention.

DETAILED DESCRIPTION

The invention relates to password detection that performs a determination in advance with respect to whether a password that a user sets when utilizing an information system such as a computer system or a network is an easily guessable password.

The present invention determines whether or not positions of keys used to input a character string as a password have a characteristic as a physical key arrangement. The present invention recognizes that, if a password is inputted by changing an order of characters in such a character string of a specific key arrangement, such a password can be easily guessed by malicious third parties. Methods of the present invention prevent such capability of easily guessing a password.

Figure 1A:
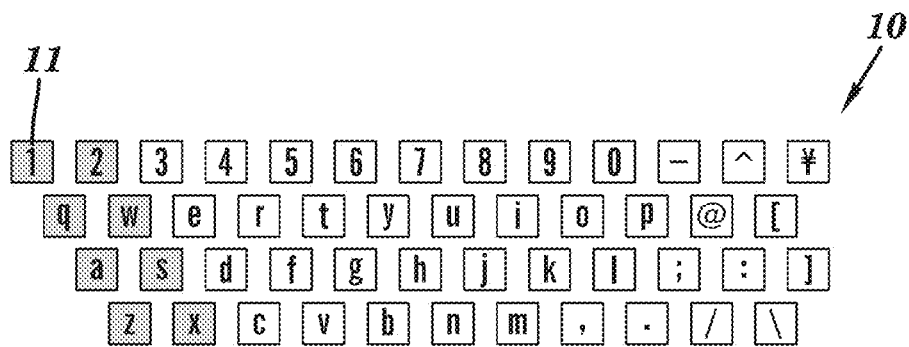
FIG. 1A depicts a keyboard with highlighted keys arranged in columns, in accordance with embodiments of the present invention.

FIG. 1A depicts a keyboard 10 with highlighted keys 11 arranged in columns, in accordance with embodiments of the present invention. In FIG. 1A, a password may be generated from the character string "ZAQ12WSX" (or the lower case variant of "zaq12wsx") of highlighted keys 11, utilizing the characteristics of a physical key arrangement on the keyboard 10, by using only the highlighted keys 11 in the first and second vertical columns on the left side of the keyboard 10.

Figure 1B:
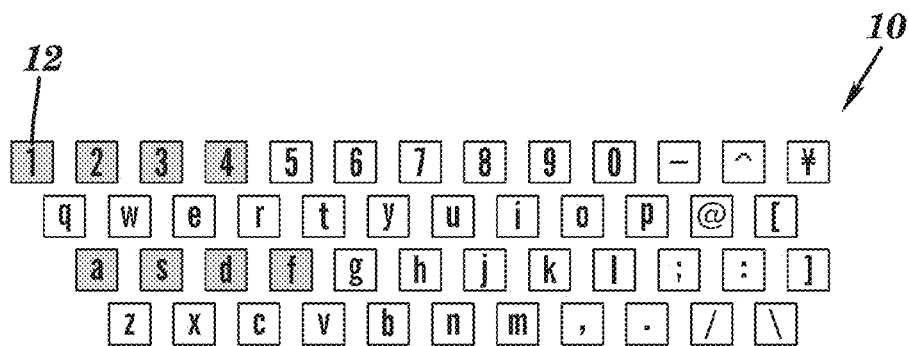
FIG. 1B depicts a keyboard with highlighted keys arranged in rows, in accordance with embodiments of the present invention.

FIG. 1B depicts the keyboard 10 with highlighted keys 12 arranged in rows, in accordance with embodiments of the present invention. In FIG. 1B, a password may be generated from the character string "ASDF1234" (or the lower case variant of "asdf1234") of highlighted keys 12, utilizing the characteristics of a physical key arrangement on the keyboard 10, by using only the highlighted keys 12 in the first and third horizontal rows.

The key arrangements with respect to passwords that are generated utilizing the physical key arrangement on the keyboard may have at least one or more of the following three characteristics: (i) a first characteristic in which the keys are arranged at consecutive positions, such as in a vertical column, in a horizontal row, or in a diagonal column; (ii) a second characteristic in which the keys are arranged at positions that approximate a shape such as a triangle or a square, a character such as "V" or "Z", or a numeral such as "2" or "7"; and (iii) a third characteristic in which the key arrangement is a symmetrical positional relationship such as left-right or up-down (or alternatively or right-left, down-up).

The preceding three characteristics result from the keys used for inputting a character string as a password being arranged at positions that are relatively close together on a keyboard. Therefore, a positional relationship of keys which are used for inputting a character string as a password may be detected in two directions on the keyboard; i.e., a vertical column direction and a horizontal row direction. The detection frequency of the keys in vertical columns and horizontal rows is then computed, and it is determined whether the password that is input is a character string constituting a password generated utilizing a physical key arrangement on the keyboard.

Detection as to whether or not the respective keys used to input a character string as a password are keys that are used to input a password utilizing a characteristic of the physical key arrangement on a keyboard is performed by dividing the positions of keys into vertical columns and horizontal rows on the keyboard, and detecting how many pertinent keys were used in each vertical column and each horizontal row.

Key Detection for Horizontal Rows

Figures 2, 3:
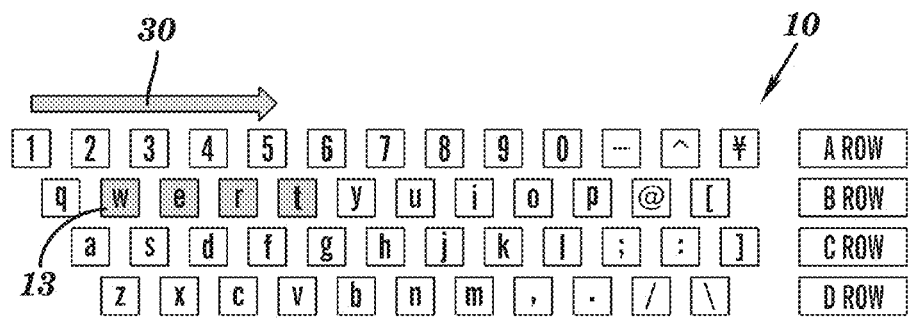
FIG. 2 depicts a keyboard with highlighted keys in a first arrangement in a second row, in accordance with embodiments of the present invention.
FIG. 3 depicts results from analysis of the keyboard of FIG. 2, in accordance with embodiments of the present invention.

FIG. 2 depicts the keyboard 10 with highlighted keys 13 in a first arrangement in a second row, in accordance with embodiments of the present invention.

As shown in FIG. 2, the horizontal rows of the keyboard 10 are four rows referred to as "A row", "B row", "C row" and "D row". In each row of these four rows, the keys are configured in a straight line. The number of rows may increase or decrease depending on the type of keyboard.

In one embodiment, for each row in FIG. 2, the detection of keys is counted from left to right in a direction 30. For the keyboard 10 shown in FIG. 2, the starting positions for counting keys are the keys "1", "q", "a" and "z". For each row in FIG. 2, if a key is detected based on the password, a flag is set to "1". If a key is not detected based on the password, the flag is set to "0". Thus, the value of each flag is 0 or 1, respectively denoted as a "positive flag" or a "null flag", corresponding to the "0" flag or "1" flag, respectively. The detected keys are the highlighted keys "w, e, r, t". Alternatively, the detection of keys may be counted from right to left in a direction opposite to the direction 30, with the starting positions for counting keys being keys "¥", "[", "]" and "\".

The method of the present invention counts the "1" flags, and does not count the "0" flags. In particular, if each flag is either a "0" flag or a "1" flag, a count for the row is a sum of the values of those "1" flags in the row having an adjacent flag (i.e., an immediately previous flag or an immediately next flag) in the row that is also a "1" flag. The key detection frequency (KDF) for a row is the count for the row.

FIG. 3 depicts results from analysis of the keyboard 10 of FIG. 2, in accordance with embodiments of the present invention. The highlighted keys are the detected keys "w, e, r, t" as shown in FIG.

FIG. 3 shows the key detection positions all being "0" flags in A row, C row and D row, and shows the key detection positions as being "0,1,1,1,1,1,0,0,0,0,0,0,0" in B row in which there are four consecutive "1" flags. A sum of the values of four "1" flags, namely 4, is computed, since each of the "1" flags has an adjacent "1" flag in the row. Thus, the key detection frequency for B row is 4.

The flags of the keys in A row, C row and D row are all "0". Therefore, the key detection frequency for A row, C row and D row is "0".

Figures 4, 5:
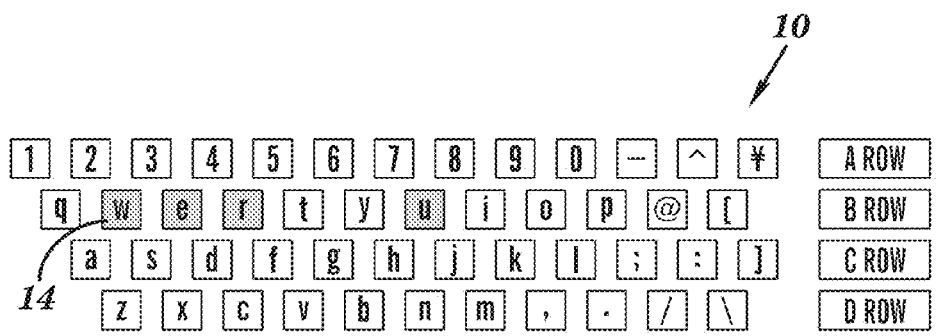
FIG. 4 depicts a keyboard with highlighted keys in a second arrangement in a second row, in accordance with embodiments of the present invention.
FIG. 5 depicts results from analysis of the keyboard of FIG. 4, in accordance with embodiments of the present invention.

FIG. 4 depicts the keyboard 10 with highlighted keys 14 in a second arrangement in a second row, in accordance with embodiments of the present invention. The highlighted keys 14 are w, e, r, u".

FIG. 5 depicts results from analysis of the keyboard 10 of FIG. 4, in accordance with embodiments of the present invention. The highlighted keys are the detected keys "w, e, r, u" as shown in FIG. 4.

The key detection position result for B row is "0,1,1,1,0, 0,1,0,0,0,0,0" in which there are three consecutive "1" flags. A sum of the values of three "1" flags, namely 3, is computed, since each of the "1" flags has an adjacent "1" flag in the row. Thus, the key detection frequency for B row is 3.

Figures 6, 7:
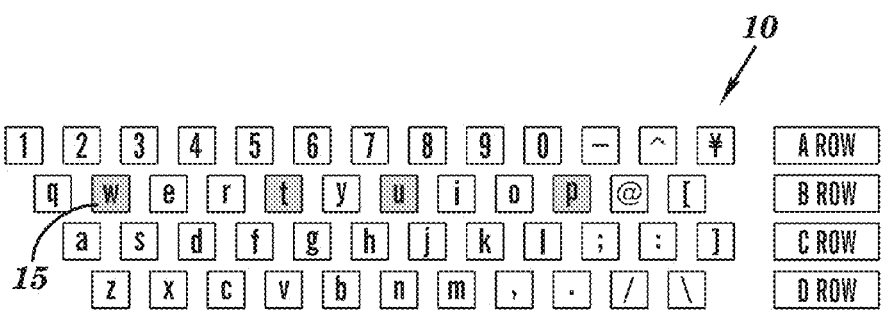
FIG. 6 depicts a keyboard with highlighted keys in a third arrangement in a second row, in accordance with embodiments of the present invention.
FIG. 7 depicts results from analysis of the keyboard of FIG. 6, in accordance with embodiments of the present invention.

FIG. 6 depicts the keyboard 10 with highlighted keys 15 in a third arrangement in a second row, in accordance with embodiments of the present invention. The highlighted keys 15 are "w, t, u, p".

FIG. 7 depicts results from analysis of the keyboard 10 of FIG. 6, in accordance with embodiments of the present invention. The highlighted keys are the detected keys "w, t, u, p" as shown in FIG. 6.

The key detection position result for B row is "0,1,0,0,1, 0,1,0,0,1,0,0". Since there are no consecutive "1" flags, the count for B row is 0 and the key detection frequency for B row is 0.

Although FIGS. 3-7 have been discussed in terms of detecting and counting keys from left to right in the direction 30 (see FIG. 2), the scope of the present invention includes, alternatively, detecting and counting keys from right to left in a direction opposite to the direction 30.

Key Detection for Vertical Columns

Figure 8:
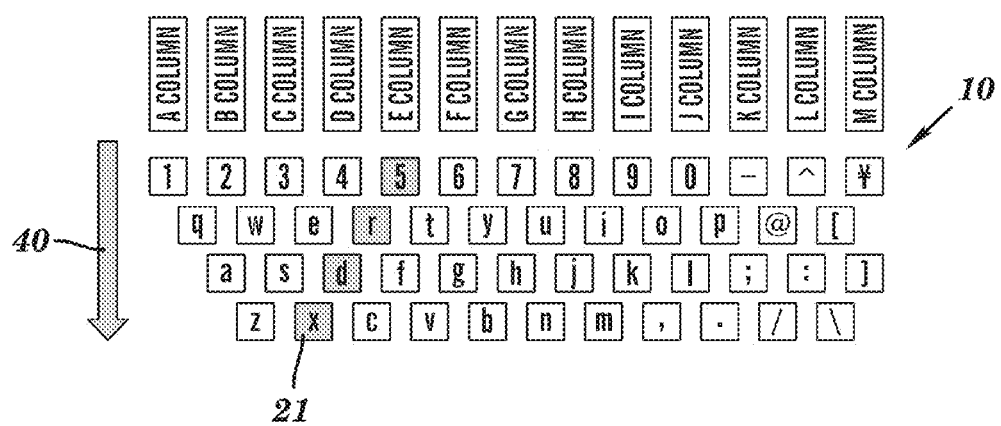
FIG. 8 depicts a keyboard with highlighted keys in a fourth arrangement in a vertical column, in accordance with embodiments of the present invention.

FIG. 8 depicts the keyboard 10 with highlighted keys 21 in a fourth arrangement in a vertical column, in accordance with embodiments of the present invention.

In one embodiment, for each column, detected keys are highlighted and counted in order from top to bottom in a downward direction 40 (or alternatively, bottom to top in another embodiment).

For the keyboard shown in FIG. 8, the starting positions for counting keys are the keys "1" "2", "3" . . . "¥". The number of columns may increase or decrease depending on the type of keyboard. The highlighted keys 21 are "5, r, d, x". Alternatively, the keys may be counted from bottom to top in a direction opposite to the direction 40, with the starting positions for counting keys being keys "z", "x", "c . . . "\".

For each column, if a key is detected based on the password, a flag is set to "1". If a key is not detected based on the password, the flag is set to "0".

The system only counts the "1" flags, and does not count the "0" flags.

The system performs addition for a relevant column only if the next flag after below) a "1" flag is also a "1" flag.

For the keyboard 10 shown in FIG. 8, the columns of keys are not arranged in a straight line, but rather are diagonally arranged in the downward direction 40. Depending on the type of keyboard, a column of keys may be arranged in a straight line.

Figure 9:
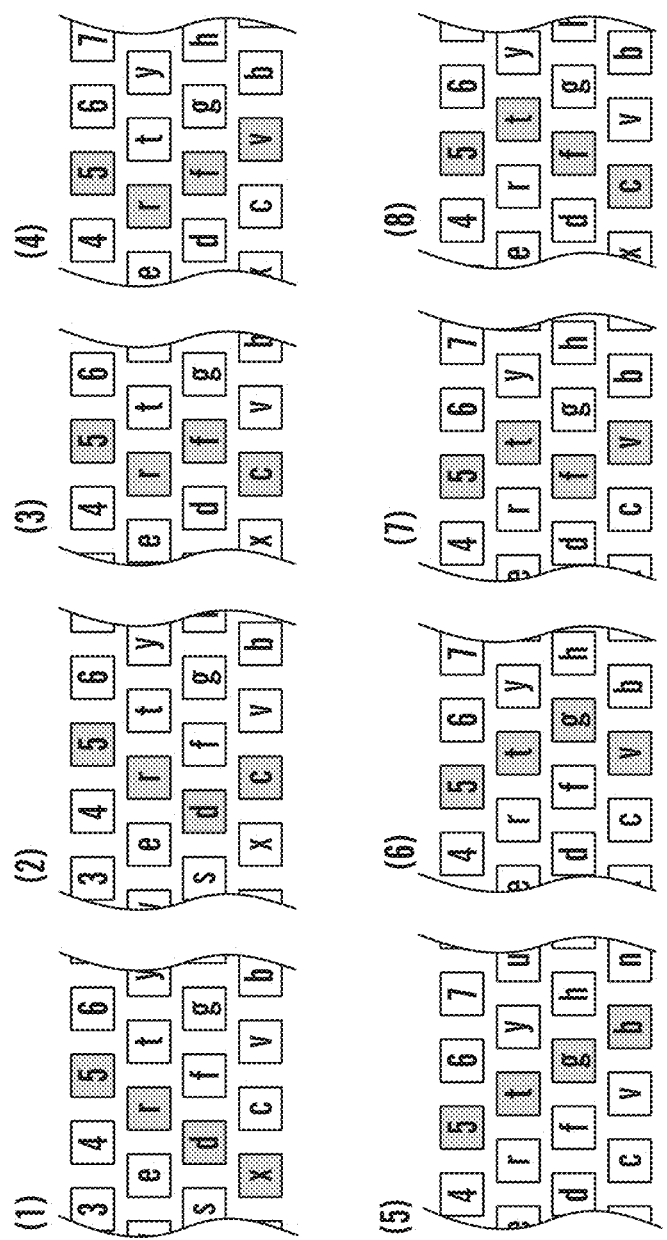
FIG. 9 depicts eight different key paths, each key path being a path of keys starting from a detected key for a column in FIG. 8 and ending at a key in the bottom row of the keyboard, in accordance with embodiments of the present invention.

FIG. 9 depicts eight different keys paths, each key path being defined as a path of keys starting from the detected key for a column (i.e., the "5" for E column in FIG. 8) and ending at a key in the bottom row of the keyboard, in accordance with embodiments of the present invention. Each key path is associated with a same column (e.g., E column in FIG. 8).

If each flag is either a "0" flag or a "1" flag, a count for each key path is a sum of the values of those "1" flags in the key path having an adjacent flag (i.e., an immediately previous flag or an immediately next flag) in the key path that is also a "1" flag. The key detection frequency for a column is the maximum count among the counts of the different key paths (e.g., the eight different key paths of keys of E column).

As deduced from FIG. 8 and depicted in FIG. 9, the number of different key paths depends on the position of the column. Depending on the position of the column, there may be less than eight different key paths. For example, there is only one key path for A column; i.e., "1, q, a, z". There are four key paths for B column; i.e. "2,q,a,z", "2,w,a,z" "2,w, s,z, and "2,w,s,x".

The key detection position result for "5, r, d, x" for each of the eight key paths is "1,1,1" which includes four consecutive "1" flags. A sum of the values of four "1" flags, namely 4, is computed, since each of the "1" flags has an adjacent "1" flag. Thus, the maximum count among the counts of the different key paths is 4. Accordingly, the key detection frequency for E column is 4.

FIG. 10 depicts results from analysis of the keyboard 10 of FIG. 8 and the key paths of FIG. 9, in accordance with embodiments of the present invention. The highlighted keys are the detected keys "5, r, d, x" as shown in FIG. 8.

Although FIGS. 8-10 have been discussed in terms of detecting and counting keys from top to bottom in the direction 40 (see FIG. 8), the scope of the present invention includes, alternatively, detecting and counting keys from bottom to top in a direction opposite to the direction 40.

Determining Whether Password is Generated by Key Input Operation Utilizing Characteristics of Arrangement of Keys on Keyboard A maximum detection frequency for rows and columns is set depending on the number of characters to be input to generate a password, or on the type of keyboard. A threshold key detection frequency is specified or pre-determined (e.g., at a time the password is inputted). The key detection frequency is determined for the rows and columns. If the determined detection frequency is equal to or greater than the threshold key detection frequency, then it is determined that the password is generated by a key input operation that utilizes characteristics of the physical key arrangement on the keyboard.

The threshold key detection frequency can be flexibly set (i.e., specified or pre-determined) according to the information system that is used.

For example, if a password has eight characters and if the threshold key detection frequency for the rows and the columns is set to "4" and if the determined detection frequency for either a row or a column is equal to or greater than "4", it is determined that the password is generated by a key input operation that utilizes characteristics of the physical key arrangement on the keyboard. Depending on the information system that is used, the threshold key detection frequency for rows and columns may be set to a smaller value (e.g., "3") in order to increase the strength (i.e., likelihood) of the password determination from characteristics of the physical key arrangement on the keyboard.

In one embodiment, if the number of characters to be used for a password is increased to 10 characters or 12 characters, or depending on the type of keyboard of the like, the threshold key detection frequency for rows and columns may be set to separate values for individual rows and columns.

EXAMPLES

Figure 11:
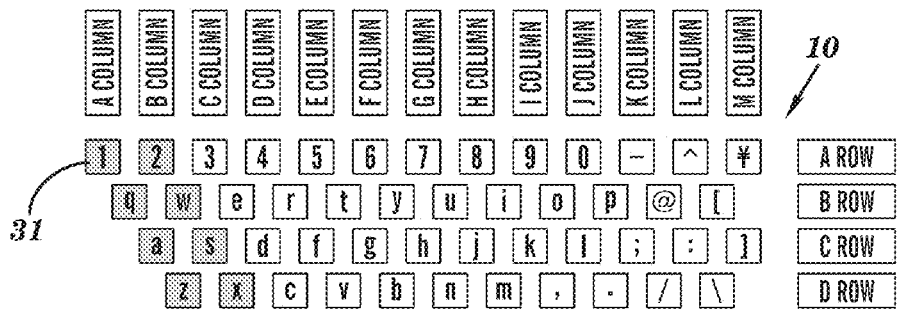
FIG. 11 depicts a keyboard with highlighted keys in a fifth arrangement, in accordance with embodiments of the present invention.

FIG. 11 depicts the keyboard 10 with highlighted keys 31 in a fifth arrangement, in accordance with embodiments of the present invention. The highlighted keys 31 are "1,q, a,z,x,s,w,2".

If a password is generated using the two columns on the left side of a keyboard 10 by using the keys "z,a,q,1,2,w,s,x", the detection results for the rows and columns, regardless of the key input order, are as shown in FIG. 11.

For A column and B column, the key detection frequency is obtained by calculating 1+1+1+1, which results in a total of "4". If the threshold key detection frequency is "4", it is determined that the password is generated by a key input operation that utilizes characteristics of the physical key arrangement on the keyboard.

Figure 12:
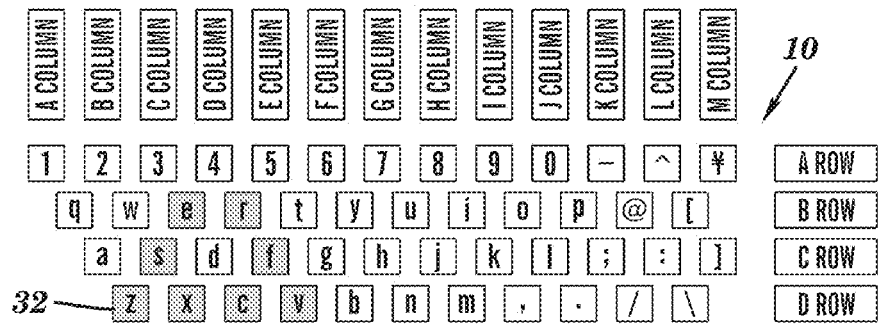
FIG. 12 depicts a keyboard with highlighted keys in a sixth arrangement, in accordance with embodiments of the present invention.

FIG. 12 depicts the keyboard 10 with highlighted keys 32 in a sixth arrangement, in accordance with embodiments of the present invention. The highlighted key's 32 are "eszx-cvfr.

In FIG. 12, a password is generated with an image of a triangle by using the keys "eszxcvfr". The key detection positions for the rows and columns, regardless of the key input order, are as shown in FIG. 12.

Figure 13:
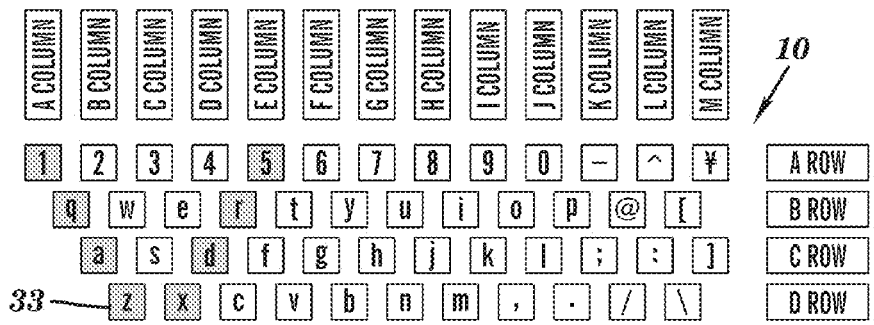
FIG. 13 depicts a keyboard with highlighted keys in a seventh arrangement, in accordance with embodiments of the present invention.

FIG. 13 depicts the keyboard 10 with highlighted keys 33 in a seventh arrangement, in accordance with embodiments of the present invention. The highlighted keys 33 are "1,q, a,z,x,d,r,5".

In FIG. 13, a password is generated with an image of a the character "V" by using the keys "1,q,a,z,x,d,r,5". The detection results for the rows and columns, regardless of the key input order, are as shown in FIG. 13.

For A column and F column, the key detection frequency is obtained by calculating 1+1+1+1, which results in a total of "4". If the threshold key detection frequency is "4", it is determined that the password is generated by a key input operation that utilizes characteristics of the physical key arrangement on the keyboard.

Figure 14:
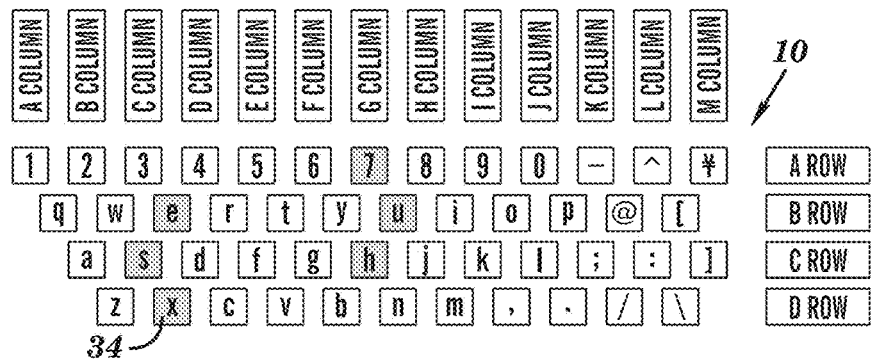
FIG. 14 depicts a keyboard with highlighted keys in an eighth arrangement, in accordance with embodiments of the present invention.

FIG. 14 depicts the keyboard 10 with highlighted keys 34 in an eighth arrangement, in accordance with embodiments of the present invention. The highlighted keys 34 are "e,s, x,7,u,h".

If the same key is used two or more times, a value that is the same number as the usage frequency is counted as the detection frequency. An upper limit for the usage frequency of the same key may also be prescribed by a password rule.

For example, in the case of a password "e,e,s,x,7,7,u,h" that is input using the keys "e" and "7" two times each, the detection results for the rows and columns, regardless of the key input order, are as shown in FIG. 14.

The flags for the keys "e" and "7" are "2" flags. Each "2" flag has a value of 2.

In one embodiment, if a character appears M times in a password, the flag for the character is "M" and the value of the character is M. For example, the character "k" appears three times in the password "2kk7gsak". Thus, the flag for the character "k" in the previous password is "3.

Each flag for a character is either a "null flag" or a "positive flag".

A "null flag" for a character is defined to be a "0" flag.

A "positive flag" for a character is defined to be a flag that is not a "0" flag. Examples of positive flags are "1", "2", "3", "4", etc., each positive flag denoting the total number of appearances of a character in a password.

A "key vector" of a keyboard is defined to be a (i) a row of keys (from a leftmost key of the row to the rightmost key of the row, or alternatively from the rightmost key of the row leftmost key of the row) or (ii) a column of keys or a key path associated with a column (from a character in a top row to a character in a bottom row, or alternatively from a character in a bottom row to a character in a top row).

Generally, a count for each key vector is defined to be a sum of the values of those positive flags in the key vector having an adjacent flag (i.e., an immediately previous flag or an immediately next flag) in the key vector that is also a positive flag. The key detection frequency for the key vector is defined to be the count for the key vector (i.e., the sum of the values of those positive flags in the key vector having an adjacent flag).

A maximum key detection frequency is determined from among the key detection frequencies of all of the key vectors. The maximum key detection frequency is compared with the threshold key detection frequency to determine whether the password is generated by a key input operation that utilizes one or more characteristics of the physical key arrangement on the keyboard. If the maximum key detection frequency is equal to or greater than the threshold key detection frequency, then it is determined that the password is generated by a key input operation that utilizes characteristics of the physical key arrangement on the keyboard. If the maximum key detection frequency is less than the threshold key detection frequency, then it is determined that the password is not generated by a key input operation that utilizes characteristics of the physical key arrangement on the keyboard.

Thus in FIG. 14, the count is obtained by calculating 2+1+1 (i.e., 4) for each of C column, D column and G column, since each of the positive flags ("2", "1", "1") has an adjacent positive flag in each of C column, D column and G column. Thus, the key detection frequency for each of C column, D column and G column is 4. If the threshold key detection frequency is "4", it is determined that the password is generated by a key input operation that utilizes characteristics of the physical key arrangement on the keyboard.

Thus, the password detection system determines whether a character string that is input is an easily guessable password, and displays the result thereof on a screen of a computer system or the like.

Figure 15:
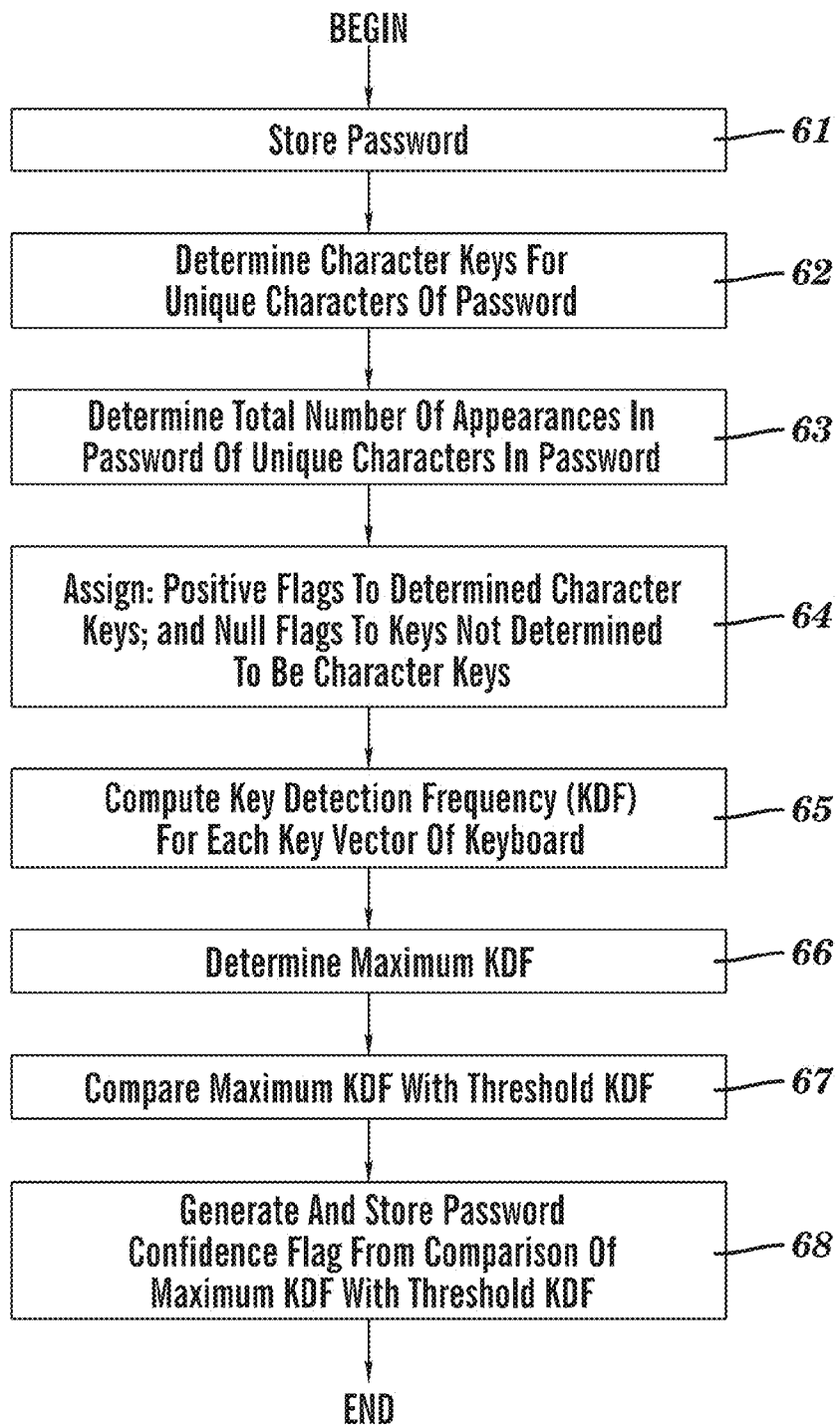
FIG. 15 is a flow chart of a method for assessing whether a password can be generated by using characteristics of a physical arrangement of keys of a keyboard, in accordance with embodiments of the present invention.

FIG. 15 is a flow chart of a method for assessing a password based on characteristics of a physical arrangement of keys of a keyboard, in accordance with embodiments of the present invention. The flow chart of FIG. 15 includes steps 61-68.

Step 61 stores, in a data store of a computer system by one or more processors of the computer system, a password. The password consists of a plurality of characters that include at least two unique characters. The data store is a hardware storage device such as, inter ally, the memory device 94 or 95 in the computer system 90 of FIG. 16.

Step 62 determines, for each unique character of the password, a character key (of the keyboard) which denotes the unique character of the password.

Step 63 determines, for each determined character key of the keyboard, a total number of appearances (M), in the password, of the unique character denoted by each determined character key. In one embodiment, M=1 for each unique character in the password.

Step 64 assigns: (i) to each determined character key of the keyboard, a positive flag having a value equal to at least 1; and (ii) to each key of the keyboard that is not one of the determined character keys, a null flag having a value of 0. In one embodiment, the assigning includes assigning, to each determined character key of the keyboard, the positive flag having a value equal to a function f(M) subject to f(M) being equal to at least 1.

In one embodiment, f(M) is a linear function of M such as, inter cilia, f(M)=M.

In one embodiment, f(M) is a non-linear function of M such as, inter alia, $f(M)=M^P$ (e.g., P=0.5, 1.5, 2, 3, or f(M)=a exp(bM) wherein a and b are each constant.

Step 65 computes, for each key vector of the keyboard, a key detection frequency as equal to a sum of the values of the positive flags of the character keys in the key vector. The computed key detection frequencies are independent of how the plurality of characters are ordered in the password.

Step 66 determines a maximum key detection frequency from among the computed key detection frequencies of the key vectors.

Step 67 compares the maximum key detection frequency with a threshold key detection frequency and ascertains from the comparison whether or not the maximum key detection frequency is equal to or greater than the threshold key detection frequency.

Step 68 generates and stores, in a data store of the computer system, a password confidence flag whose value denotes that: (i) the maximum key detection frequency is equal to or greater than the threshold key detection frequency, in response to said ascertaining having ascertained that the maximum key detection frequency is equal to or greater than the threshold key detection frequency; or (ii) the maximum key detection frequency is less than the threshold key detection frequency, in response to said ascertaining having ascertained that the maximum key detection frequency is less than the threshold key detection frequency.

Figure 16:
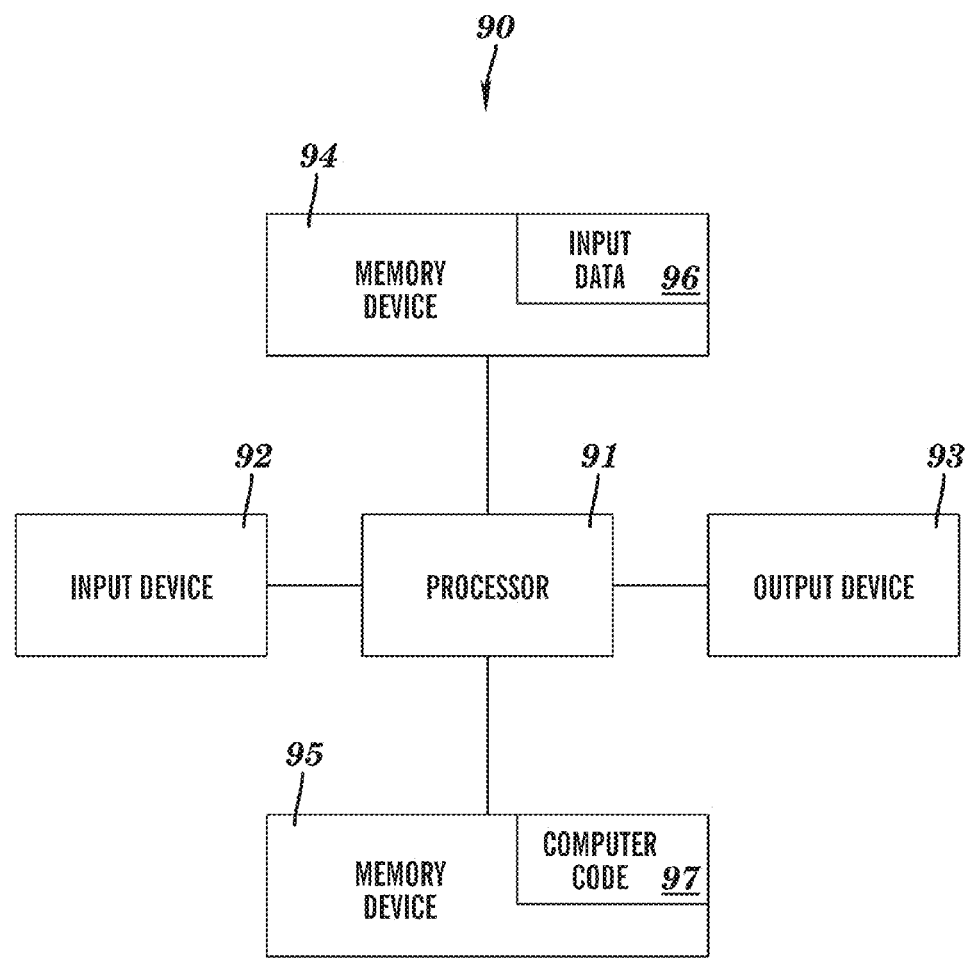
FIG. 16 illustrates a computer system used for implementing the methods of the present invention.

FIG. 16 illustrates a computer system 90 used for implementing the methods of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97 which is a computer program that includes computer-executable instructions. The computer code 97 includes software or program instructions that may implement an algorithm for implementing methods of the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 16) may be used as a computer usable storage medium (or program storage device) having a computer readable program embodied therein and/or having other data stored therein, wherein the computer readable program includes the computer code 97. Generally, a computer program product (or, alternatively, an article of manufacture) of the computer system 90 may include the computer usable storage medium (or said program storage device).

The processor 91 may represent one or more processors. The memory device 94 and/or the memory device 95 may represent one or more computer readable hardware storage devices and/or one or more memories.

Thus the present invention discloses a process for supporting, deploying and/or integrating computer infrastructure, integrating, hosting, maintaining, and deploying computer-readable code into the computer system 90, wherein the code in combination with the computer system 90 is capable of implementing the methods of the present invention.

While FIG. 16 shows the computer system 90 as a particular configuration of hardware and software, any configuration of hardware and software, as would be known to a person of ordinary skill in the art, may be utilized for the purposes stated supra in conjunction with the particular computer system 90 of FIG. 16. For example, the memory devices 94 and 95 may be portions of a single memory device rather than separate memory devices.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, Firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code containing instructions executable by one or more processors to implement the methods of the present invention.

A computer system of the present invention comprises one or more processors, one or more memories, and one or more computer readable hardware storage devices, said one or more hardware storage devices containing program code executable by the one or more processors via the one or more memories to implement the methods of the present invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for assessing a password based on characteristics of a physical arrangement of keys of a keyboard, said method comprising:

storing, in a data store of a computer system by one or more processors of the computer system, a password consisting of a plurality of characters that include at least two unique characters;

for each unique character of the password, said one or more processors determining a character key, of the keyboard, which denotes the unique character of the password;

said one or more processors assigning: (i) to each determined character key of the keyboard, a positive flag having a value equal to at least 1; and (ii) to each key of the keyboard that is not one of the determined character keys, a null flag having a value of 0;

for each key vector of the keyboard, said one or more processors computing a key detection frequency as equal to a sum of the values of the positive flags of the determined character keys in the key vector;

said one or more processors determining a maximum key detection frequency from among the computed key detection frequencies of the key vectors; and said one or more processors comparing the maximum key detection frequency with a threshold key detection frequency and ascertaining from said comparing whether or not the maximum key detection frequency is equal to or greater than the threshold key detection frequency.

2. The method of claim 1, said method comprising:

said one or more processors generating and storing, in the data store, a password confidence flag whose value denotes that: (i) the maximum key detection frequency is equal to or greater than the threshold key detection frequency, in response to said ascertaining having ascertained that the maximum key detection frequency is equal to or greater than the threshold key detection frequency; or (ii) the maximum key detection frequency is less than the threshold key detection frequency, in response to said ascertaining having ascertained that the maximum key detection frequency is less than the threshold key detection frequency.

3. The method of claim 1, wherein the computed key detection frequencies are independent of how the plurality of characters are ordered in the password.

4. The method of claim 1, said method comprising:

prior to said assigning, said one or more processors determining, for each determined character key of the keyboard, a total number of appearances (M), in the password, of the unique character denoted by said each determined character key, and wherein said assigning comprises assigning, to each determined character key of the keyboard, the positive flag having the value equal to a function f(M) subject to f(M) being equal to at least 1.

5. The method of claim 4, wherein M>1 for at least one unique character in the password.

6. The method of claim 5, wherein f(M)=M.

7. The method of claim 5, wherein f(M) is a non-linear monotonically increasing function of M.

8. The method of claim 4, wherein M=1 for each unique character in the password.

9. A computer program product, comprising one or more computer readable hardware storage devices having computer readable program code stored therein, said program code containing instructions executable by one or more processors of a computer system to implement a method for assessing a password based on characteristics of a physical arrangement of keys of a keyboard, said method comprising:

said one or more processors storing, in a data store of the computer system, a password, said password consisting a plurality of characters that include at least two unique characters;

for each unique character of the password, said one or more processors determining a character key, of the keyboard, which denotes the unique character of the password;

said one or more processors assigning: (i) to each determined character key of the keyboard, a positive flag having a value equal to at least 1; and (ii) to each key of the keyboard that is not one of the determined character keys, a null flag having a value of 0;

for each key vector of the keyboard, said one or more processors computing a key detection frequency as equal to a sum of the values of the positive flags of the determined character keys in the key vector;

said one or more processors determining a maximum key detection frequency from among the computed key detection frequencies of the key vectors; and said one or more processors comparing the maximum key detection frequency with a threshold key detection frequency and ascertaining from said comparing whether or not the maximum key detection frequency is equal to or greater than the threshold key detection frequency.

10. The computer program product of claim 9, said method comprising:

said one or more processors generating and storing, in the data store, a password confidence flag whose value denotes that: (i) the maximum key detection frequency is equal to or greater than the threshold key detection frequency, in response to said ascertaining having ascertained that the maximum key detection frequency is equal to or greater than the threshold key detection frequency; or (ii) the maximum key detection frequency is less than the threshold key detection frequency, in response to said ascertaining having ascertained that the maximum key detection frequency is less than the threshold key detection frequency.

11. The computer program product of claim 9, wherein the computed key detection frequencies are independent of how the plurality of characters are ordered in the password.

12. The computer program product of claim 9, said method comprising:

prior to said assigning, said one or more processors determining, for each determined character key of the keyboard, a total number of appearances (M), in the password, of the unique character denoted by said each determined character key, and wherein said assigning comprises assigning, to each determined character key of the keyboard, the positive flag having the value equal to a function f(M) subject to f(M) being equal to at least 1.

13. The computer program product of claim 12, wherein M>1 for at least one unique character in the password.

14. The computer program product of claim 13, wherein f(M)=M.

15. A computer system, comprising one or more processors, one or more memories, and one or more computer readable hardware storage devices, said one or more hardware storage device containing program code executable by the one or more processors via the one or more memories to implement a method for assessing a password based on characteristics of a physical arrangement of keys of a keyboard, said method comprising:

said one or more processors storing, in a data store of the computer system, a password, said password consisting a plurality of characters that include at least two unique characters;

for each unique character of the password, said one or more processors determining a character key, of the keyboard, which denotes the unique character of the password;

said one or more processors assigning: (i) to each determined character key of the keyboard, a positive flag having a value equal to at least 1; and (ii) to each key of the keyboard that is not one of the determined character keys, a null flag having a value of 0;

for each key vector of the keyboard, said one or more processors computing a key detection frequency as equal to a sum of the values of the positive flags of the determined character keys in the key vector;

said one or more processors determining a maximum key detection frequency from among the computed key detection frequencies of the key vectors; and said one or more processors comparing the maximum key detection frequency with a threshold key detection frequency and ascertaining from said comparing whether or not the maximum key detection frequency is equal to or greater than the threshold key detection frequency.

16. The computer system of claim 15, said method comprising:

said one or more processors generating and storing, in the data store, a password confidence flag whose value denotes that: (i) the maximum key detection frequency is equal to or greater than the threshold key detection frequency, in response to said ascertaining having ascertained that the maximum key detection frequency is equal to or greater than the threshold key detection frequency; or (ii) the maximum key detection frequency is less than the threshold key detection frequency, in response to said ascertaining having ascertained that the maximum key detection frequency is less than the threshold key detection frequency.

17. The computer system of claim 15, wherein the computed key detection frequencies are independent of how the plurality of characters are ordered in the password.

18. The computer system of claim 15, said method comprising:

prior to said assigning, said one or more processors determining, for each determined character key of the keyboard, a total number of appearances (M), in the password, of the unique character denoted by said each determined character key, and wherein said assigning comprises assigning, to each determined character key of the keyboard, the positive flag having the value equal to a function f(M) subject to f(M) being equal to at least 1.

19. The computer system of claim 18, wherein M>1 for at least one unique character in the password.

20. The computer system of claim 19, wherein f(M)=M.

* * * * *